March 3, 1959 T. C. HAWES 2,875,511
METHOD FOR COINING BLANKS FOR DEEP DRAWN
CYLINDERS, AND PRODUCT THEREOF
Original Filed Aug. 23, 1954 5 Sheets-Sheet 2

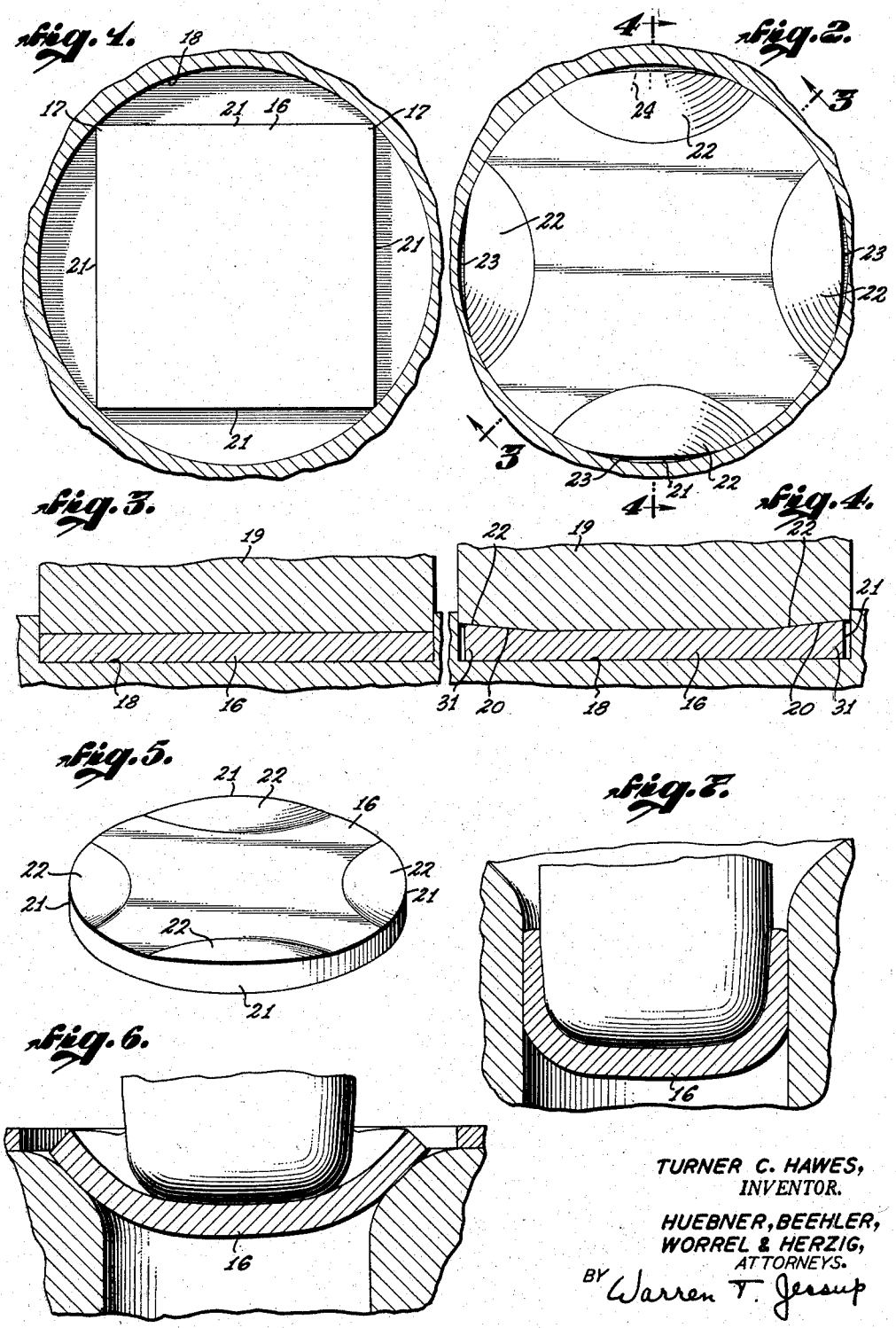

TURNER C. HAWES,
INVENTOR.

HUEBNER, BEEHLER,
WORREL & HERZIG,
ATTORNEYS.
BY Warren T. Jessup

March 3, 1959  T. C. HAWES  2,875,511
METHOD FOR COINING BLANKS FOR DEEP DRAWN
CYLINDERS, AND PRODUCT THEREOF
Original Filed Aug. 23, 1954  5 Sheets-Sheet 3

TURNER C. HAWES,
INVENTOR.

HUEBNER, BEEHLER,
WORREL & HERZIG,
ATTORNEYS.
BY Warren T. Jessup

March 3, 1959　　　　　T. C. HAWES　　　　　2,875,511
METHOD FOR COINING BLANKS FOR DEEP DRAWN
CYLINDERS, AND PRODUCT THEREOF
Original Filed Aug. 23, 1954　　　　　5 Sheets-Sheet 4

TURNER C. HAWES,
INVENTOR.

HUEBNER, BEEHLER,
WORREL & HERZIG,
ATTORNEYS.
BY Warren T. Jessup

March 3, 1959 T. C. HAWES 2,875,511
METHOD FOR COINING BLANKS FOR DEEP DRAWN
CYLINDERS, AND PRODUCT THEREOF
Original Filed Aug. 23, 1954 5 Sheets-Sheet 5
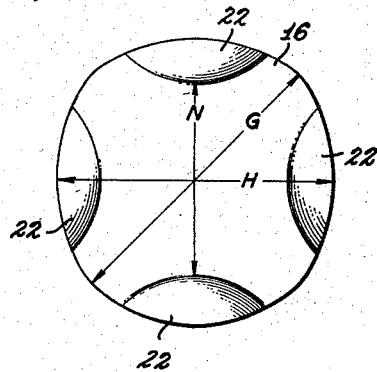
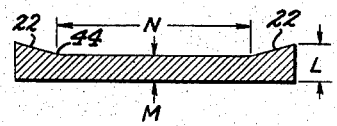
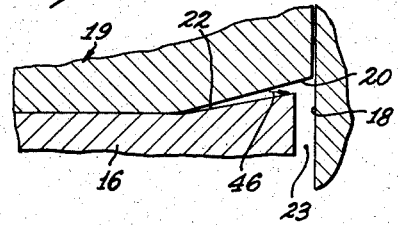
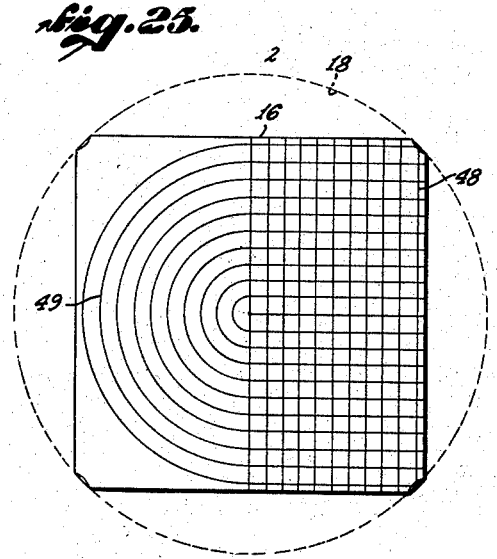
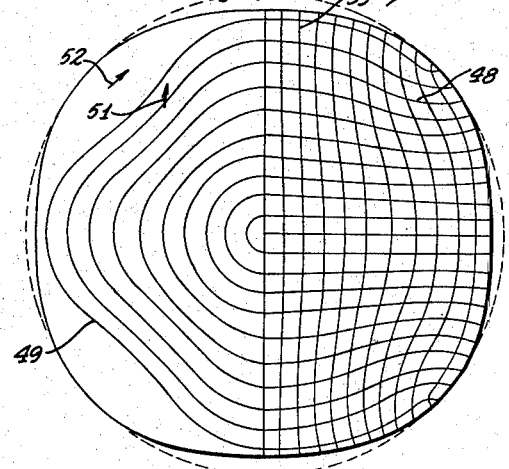
TURNER C. HAWES,
INVENTOR.
HUEBNER, BEEHLER,
WORREL & HERZIG,
ATTORNEYS.
BY Warren T. Jessup

United States Patent Office 2,875,511
Patented Mar. 3, 1959

2,875,511

METHOD FOR COINING BLANKS FOR DEEP DRAWN CYLINDERS, AND PRODUCT THEREOF

Turner C. Hawes, Los Angeles, Calif.

Continuation of abandoned application Serial No. 451,657, August 23, 1954. This application April 28, 1955, Serial No. 504,434

7 Claims. (Cl. 29—190)

This invention relates to a method of producing a metal blank from which a deep drawn cylinder may be fabricated, and to the resulting blank.

Metal cylinders having one end closed, such as cartridge cases, are often produced by subjecting a flat blank of metal to a cupping operation, followed by a successive series of draws, which progressively thin out the wall of the cylinder and make the cylinder deeper, until the desired configuration and wall thickness are attained. It is axiomatic that such a blank should, in general, be circular, since the symmetry of the circle naturally conforms to the symmetrical nature of the cylinder into which the blank is drawn. Thus the conventional practice in deep drawing cylinders is to start with a circular metal blank.

The circular metal blank, however, has the disadvantage that the stamping or cutting of such a blank from a large sheet of metal of necessity leaves, as waste, an appreciable portion of the material where the circles do not touch each other. That is to say, since each circle (at best) is tangent to the adjacent circles at only four points, the remaining area between the circles must of necessary be scrapped. From the geometry of the process, it may be readily calculated that the maximum theoretical yield of circles from a larger sheet of material is about 78.5%. In practice, the waste or scrap is even greater, and the practical yield from the stamping of circular blanks from a large sheet of metal ranges from 60% to 70%.

It is an object of this invention to provide a metal blank from which a deep-drawn cylinder may be satisfactorily fabricated, and which will not require the scrapping of a large percentage of material caused by stamping a round blank from a large rectangular sheet of metal plate.

The simplest and cheapest blank to cut from a large sheet of material is a square blank. While it is possible to deep draw a cylinder directly from a square blank, the resulting waste from long points which must be trimmed as the metal folds back on itself during the cupping and drawing operations is so great as to approximate the original wastage which would result if a circular blank had been stamped out in the first place. Therefore, to start with a square blank rather than a circular blank results in no appreciable saving.

In the past, efforts have been made to compress or coin square blanks into somewhat circular shape, so as to adapt the blank more efficiently and effectively to be operated upon by the cupping and deep drawing process. Such methods in general have not accomplished the desired objective, because as the square blank is compressed, restraints and reliefs have not been provided. Lack of restraint of the corners permits them to move radially outwardly at a rate approximately equal to the rate of radial movement of the sides, thus leaving a blank that is still essentially square after coining, and leaving the long points which still require trimming after cupping to such an extent that there is little saving of scrap.

Also, as the corners move outward radially, the length of the side of the blank increases, causing this edge to be in tension, which, in turn, causes it to tear or crack. This torn metal must also be trimmed off again causing more scrap loss.

It is another object of this invention to provide a method for producing from a substantially square blank of metal, a coined blank which may satisfactorily be deep drawn into a cylinder, with appreciably no more loss than would normally result were a circular blank to be used.

It is a further object of this invention to reduce appreciably the annealing time required before a blank is subjected to the deep-drawing process.

It is a still further object of this invention to eliminate the time consuming spheroidization step usually required before metal blanks are subjected to the deep-drawing process.

In order to attain the advantages of a circular blank without the wastage, during drawing, of a square blank, compromise efforts have been attempted at employing polygonal blanks having greater than four sides. The greater the number of sides, the closer is the approach to the advantages during drawing of the circular blank; but at the same time, the greater the wastage during the initial stamping of the blank, since it is impossible to form from a large sheet of material polygons having more than six sides without wastage of material intermediate the blanks. Even with six sided figures, there is appreciable waste along the edge of the large sheet.

In accordance with the present invention, a square blank is pressed by a punch in such a manner that the resulting coined blank may be satisfactorily drawn into a deep cylinder, with only little more trimming required than in the case of a circular blank. The method of the present invention comprises subjecting the blank to the pressure of a circular cylindrical punch having a face which is relieved selectively around the edges, so that all portions of the blank are not subjected to the same pressure. In particular, the relieved portions of the punch are disposed at the sides of the blank intermediate the corners thereof. Thus, while the corners of the blank are subjected to high compressive force, the side edges of the blank intermediate the corners are not subjected to such pressure; hence the metal from the corners tends to flow peripherally toward the sides of the blank, placing the sides under compression. This tendency to place the sides under compression offsets the natural tendency to place the sides under tension as the metal originally in the sides or edges flows radially outward. In this manner, cracking or tearing of the sides of the blank is virtually eliminated.

It is preferred to restrain radial flow at the corners of the blank during this pressing operation, so as to require the metal in the corners of the blank to flow sideways or peripherally toward the sides of the blank.

While the present invention is applicable to the coining of any polygonal blank, it is especially useful for a square blank, since a square blank is generally the cheapest blank to produce from a large sheet of material and less scrap results. Accordingly, preferred forms of the present invention will now be described with reference to the accompanying drawings illustrating, by way of example, the coining of a square blank.

Referring to the drawings:

Fig. 1 is a plan view looking down on a restraining member such as a die containing therewithin a square blank to be operated on, or coined, in accordance with the present invention.

Fig. 2 is a view similar to Fig. 1 showing the blank after it has been coined in accordance with the present invention, and with the punch removed to show the blank.

Fig. 3 is a cross section taken on line 3—3 in Fig. 2, but with the punch in place.

Fig. 4 is a cross section taken on line 4—4 of Fig. 2, with the punch in place, and sectioned.

Fig. 5 is a perspective view of a blank coined in accordance with the present invention.

Fig. 6 is a fragmentary sectional view showing an early step in the cupping of the blank illustrated in Figs. 1–4, preparatory to deep drawing.

Fig. 7 shows a subsequent stage of the cupping process.

Figure 10:
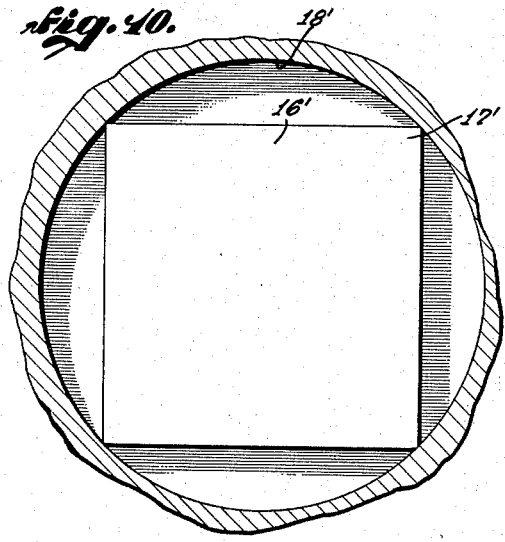
Figure 11:
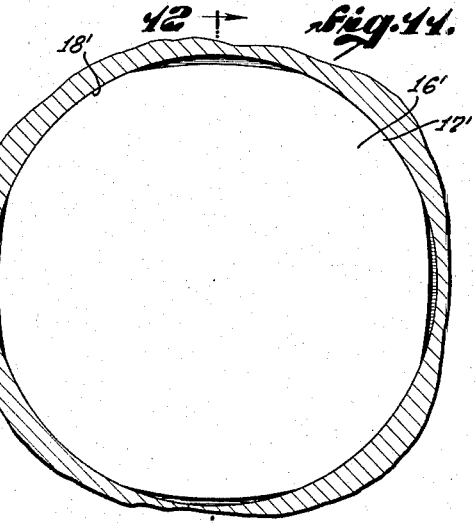
Figure 12:
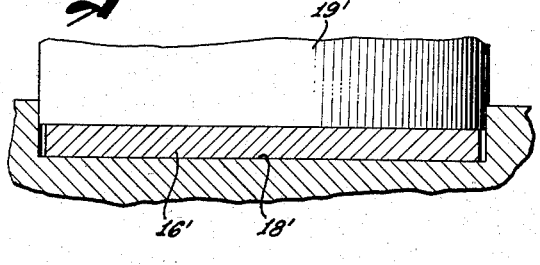

Figs. 10, 11, and 12 are views corresponding, respectively, to Figs. 1, 2, and 3 and illustrating another form of the present invention.

Figure 13:
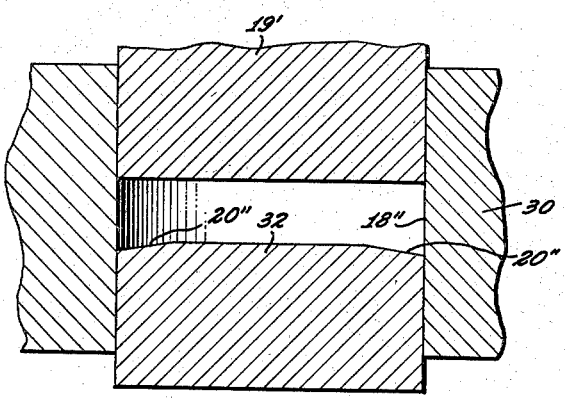

Fig. 13 is a view generally similar to Fig. 4 illustrating a third form of the present invention.

Figure 14:
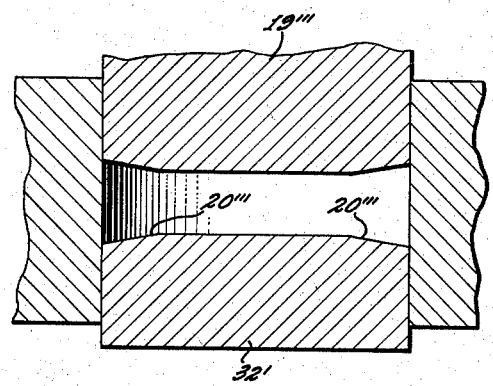
Figure 15:
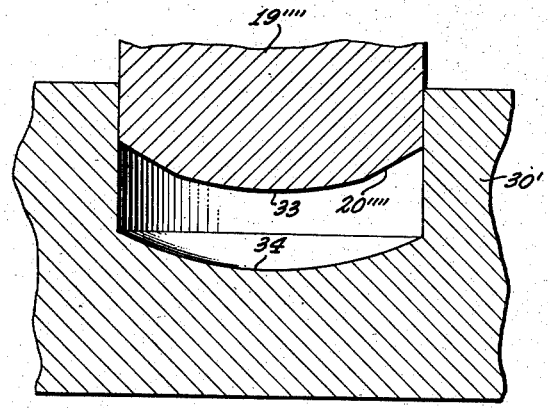

Fig. 14 is a view similar to Fig. 13 illustrating a fourth form of the present invention; and Fig. 15 is a view similar to Fig. 13 showing a fifth form of the present invention.

Figure 16:
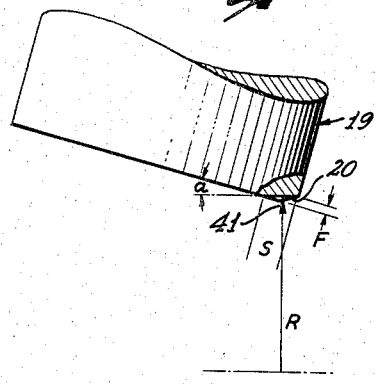

Fig. 16 is a somewhat schematic side elevation of a punch, illustrating the manner in which the punch is modified or relieved in accordance with the present invention.

Figure 17:
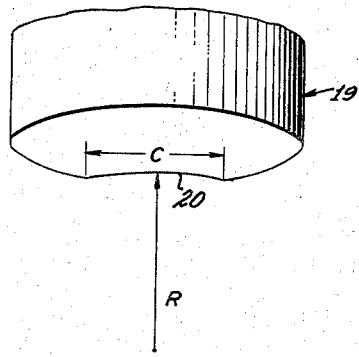

Fig. 17 is a view of the punch taken at right angles to Fig. 16.

Figure 18:
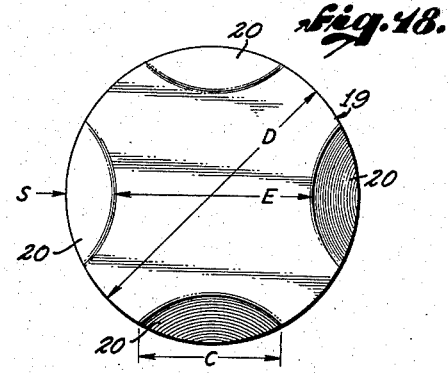

Fig. 18 shows the bottom of the punch as relieved.

Figure 19:
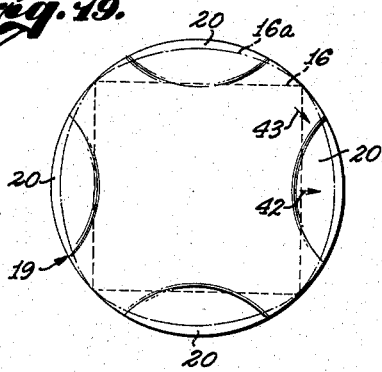

Fig. 19 shows the relation between the relieved punch face and the blank being coined.

Figure 20:
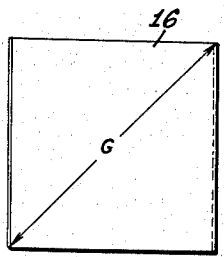

Fig. 20 is a top view of a square blank before coining.

Figure 21:
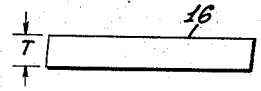

Fig. 21 is a side or edge view of the blank of Fig. 20.

Fig. 22 is a top view of the blank after it has been coined and illustrating certain dimensions.

Fig. 23 is a cross section of the blank shown in Fig. 22.

Fig. 24 is a fragmentary sectional view of the blank, with the punch and die in place, showing the relationship between the blank after coining and the face of the punch.

Fig. 25 is an illustrative view of a blank before coining; and

Fig. 26 is a view of the blank after it has been coined into a blank in accordance with the present invention.

Referring now particularly to Figs. 1–4, there is shown a substantially square metal blank or slab 16 which is to be coined in accordance with the present invention. First, the four corners 17 of the blank 16 are restrained against flow of the metal by confining the blank 16 within a cylindrical die 18, the diameter of which is substantially the same as the diagonal of the square 16.

Mating within the die 18 is a substantially circular or cylindrical punch 19, the operating face of which is substantially flat and normal to the punch axis except for the provision of four arcuate relieved portions 20. The metal blank 16 is so situated within the die 18 that the punch reliefs 20 reside immediately opposite or aligned with the center of the side edges 21 of the blank 16 intermediate the corners 17. The face of the punch 19 and the bottom face or surface of the die 18, together, constitute compression members between which the blank 16 may be compressed and coined in accordance with the present invention.

When pressure is applied to the punch 19, so as to force it against the blank 16 in the die 18, all of the blank except the side edges facing the reliefs 20 is placed under high compression sufficient to cause the metal to flow. Since the corners are restrained against outward flow, the metal, of necessity, is forced to flow peripherally or circumferentially toward the sides 21. At the same time, the metal at the sides 21 is coined radially outward, and also upward by virtue of reliefs 20.

When a predetermined pressure on the blank, or a predetermined blank thickness or spacing between faces of the two opposing compression members, has been attained, the coining operation is stopped and the die is opened to permit removal of the coined blank. By providing the reliefs 20 in the face of the punch 19, it has been found possible to terminate the coining operation before the metal has been forced fully into contact with all portions of the die 18. Thus, the center portions of the four sides 21 of the blank 16 are left spaced from the walls of the die, as shown at 23 in Fig. 2, so that the final blank is generally circular with four partially straightened or flattened sides. That is, the four original corners have substantially the curvature of the die, while the original straight edges have somewhat less curvature, as indicated at 23. The presence of the gaps 23 permits the process to be carried out at an appreciably lower maximum pressure than would be required if it were necessary to force the metal completely into conformity with the die 18.

Were it not for the confining action of the die 18 upon the corners 17, and the selective compression by the punch effected through the reliefs 20, there would be created a tension in the sides 21, which would tend to cause tears or fractures, as illustrated by the dotted lines 24 (Fig. 2). This tension would result from the fact that each side 21 must be elongated from its original length, shown in Fig. 1, to its new length shown in Fig. 2. However, the action of the present invention overcomes this tension by producing a countering compression, resulting from the flow of metal from the corners 17 circumferentially toward the sides 21. Thus the compression tends to neutralize the tension, and the side edges 21 remain virtually free of tension.

After the blank has been coined in the manner described, it may be cupped, as shown in Figs. 6 and 7, and then subjected to a successive series of dies and punches. In these operations, the wall thickness is successively decreased as the cylinder is drawn deeper and deeper.

Figure 8:
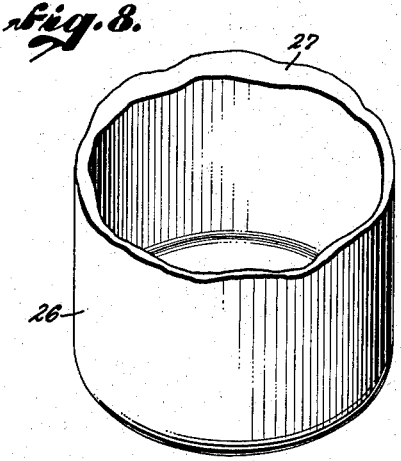
Fig. 8 shows the cylinder at an intermediate stage during the drawing process.
Figure 9:
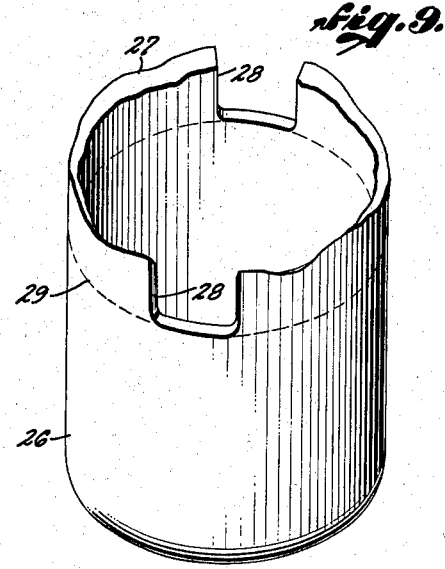
Fig. 9 shows the cylinder at still another stage in its deep drawing process.

At an intermediate stage in the drawing, the cylinder appears as shown at 26 in Fig. 8. It will be noted in Fig. 8 that the edge 27 of the cylinder 26, at the open mouth thereof, is somewhat ragged or scalloped. This is an inevitable result of the variables in the drawing process, and after every two or three drawing operations, the edge must be trimmed off to make it smooth and at right angles to the axis of the cylinder. This is done by a nibbling machine which bites out chunks of the metal all around the edge, as shown at 28, until the edge is virtually smooth and straight, as shown by the dotted line 29. This repeated trimming during the drawing operations is necessary even when a truly circular blank is used to begin with. It has been found in practice that a drawn part made from the coined blank 16 resulting from the present process requires essentially no more trimming than is required when starting with a circular blank.

During the coining operation, the circumferential or peripheral cold flow of the metal is promoted both by the restraining of the corners 17 by the die 18, and by the reliefs 20 on the punch which leave a free region into which the metal may flow. As noted above, the central portions of the sides 21 never reach the extremity of the die.

During the coining operation, the relieved portions 20 of the punch 19 produce the added advantage of a progressive operation to the compressive action of the punch, with the result that the coining operation may be achieved with a smaller maximum force than would be the case if the face of the punch were perfectly flat.

Not only do the reliefs 20 in the punch 19 prevent tearing or splitting of the side edges 21 of the blank, but the resulting elevations 22 result in a finished blank in which there is substantially the same amount of metal in every pie shaped area. Thus the elevations 22, from a volume standpoint, offset the fact that the metal never completely fills the die, but leaves the voids 23. Hence, as the blank is succesively drawn into a cylinder, as illustrated basically in Figs. 6 and 7, there is always provided an equal amount of material circumferentially around the blank, thus simulating the effect of a flat circular blank and holding to a minimum the unevenness of the edge 27 during the drawing process.

During the initial cupping of the blank 16, producing the form shown in Fig. 7, the added thickness 31 of the metal at the central areas of the sides 21 strengthens the edge appreciably and prevents folding of the side edges during the cupping operation.

The present coining method has resulted in a further advantage over a simple circular blank. In the deep drawing of cylinders from blanks made of certain steels, it has been found necessary to subject the metal prior to deep drawing to a process known as spheroidization. Such spheroidization was required because of the natural pearlitic condition of the carbides in the metal, and involved essentially an extended annealing treatment requiring in the order of 96 hours. Spheroidization, in general, is necessary because if the metal were to be cupped without being spheroidized, there would be a much greater tendency to fracture and tear during the cupping operation.

It has been discovered that the coining operation of the present invention cold works the metal to such an extent that, when followed by a very brief (one to two hour) annealing process, an internal condition is produced somewhat equivalent to spheroidization. This equivalent metallurgical structure, although not true spheroidization, permits the blank to be deep drawn with virtually the same satisfactory results as when spheroidization is practiced. In general, the annealing associated with the present process is conducted at a somewhat higher temperature than customary process annealing or spheroidization, and as noted above, is much briefer.

With certain metals, it has been found satisfactory to eliminate the reliefs in the punch 19 and merely employ the confinement of the corners during the compressing or coining operation. This is illustrated in Fig. 10, wherein a square blank 16' is placed within a confining die 18' and subjected to pressure from a punch 19' having a flat or unrelieved operating face. The resulting blank is shown in Fig. 11, wherein the metal from the corners 17' has been forced circumferentially away from the corner into the free area of the die 18' without the added assistance of the reliefs in the punch.

It is not necessary that the reliefs be on the punch 19. If desired, they may be on the bottom face of the die, as illustrated in Fig. 13. In Fig. 13 an additional modification is illustrated wherein the die is shown as being simply a member 30 having a cylindrical bore 18'' therein. In the bottom portion of the bore is situated a bottom face die 32 and in the upper portion of the bore is the movable punch 19''. As shown in Fig. 13, the reliefs 20'' are formed at the periphery of the bottom member 32. In the modification shown in Fig. 13, either the member 19' or the member 32, or both, may be reciprocable relative to the die member 30, in order to compress the blank 16, which is to be coined in accordance with the present invention.

If desired, a relief may be formed on both the upper and lower compression members, as illustrated in Fig. 14. In this figure, the upper member 19'' and the lower member 32' are both provided with reliefs 20''' which face each other so as to form peripheral raised portions 22 on opposite faces of the resulting coined blank 16.

It is also a feature of the present invention that the coining step of the present invention may be readily incorporated into the conventional pre-cupping step, in which the blank is given an initial slight cup or curvature to assume the form shown in Fig. 6. An apparatus for this purpose is shown in Fig. 15, having generally cup shaped compression faces; the punch 19'''' is provided with a convex curved face 33 which mates with a correspondingly curved concave face 34 formed on the bottom of the die member 30'. As in the previous modifications, one of the faces, in this case the face 33, is provided with peripheral reliefs 20''''. It is obvious that if desired, the reliefs 20'''' could be formed on the female face 34 or on both the faces 34 and 33. Likewise either the face 33 or 34, or both, may be made movable, along the lines illustrated in Fig. 13.

In Fig. 15 the cup shaped faces 33 and 34 have been shown as generally spherical. If desired these faces may be flat in the center and conical at the edges to form a truncated cone, which also embodies the advantages of the cup shaped die feature.

A specific embodiment of the present invention has been made having the following parameters.

The reliefs 20 in the punch 19 were formed as shown schematically in Figs. 16, 17 and 18. The face of the punch 19 was inclined to the axis of a contour lathe or milling machine by an angle "a," and the four edges of the face were relieved by the milling machine cutter 41 operating on a radius R. Milling was continued until the depth of the relief at the outer edge of the punch face was equal to a predetermined value F. The chordal length of the relief came out to be C and the inward extent of the relief came out to be S. The diameter of the punch face was D. The internal distance between reliefs was E.

In a specific instance, the following dimensions were employed:

| | | |
|---|---|---|
| D | inches | 7.48 |
| R | do | 19 |
| F | do | 1.50 |
| A | | 5° 34' |
| C | inches | 4 |
| S | do | 1.54 |
| E | do | 4.4 |

As shown in Fig. 19, when the punch was applied in accordance to the present invention to a square blank 16, the metal of the blank was caused to flow outward to occupy generally the position shown at 16a in Fig. 19. As explained hereinbefore, at the four sides 21 of the blank 16, outward flow of the metal was made less severe by the provision of the punch relief 20. As metal in the middle of the sides 20 flowed radially outward, illustrated by the arrow 42, metal also flowed circumferentially from the corners, as shown by the arrow 43.

A square blank 16, shown in Figs. 20 and 21, having a diagonal G and a thickness T, was subjected to the punch 19 and produced the coined blank shown in Figs. 22 and 23. The major diameter G of the resulting coined blank, shown in Fig. 22, was substantially the same as the diagonal G of the original square blank shown in Fig. 20 as would be expected. The minor diameter was less, being denoted by H. The blank was coined until the thickness M at the center, and over the greater portion of the blank, was attained. Actually the process was carried out until a predetermined tonnage force had been applied to the punch and it was then found that the thickness M resulted. The crest of each of the elevations 22 at the edge thereof had a thickness of L. The juncture between the elevation 22 and the central portion of the coined blank was not a sharp line, but instead was formed on a radius, as shown at 44. This was due to the fact that in the coining operation the outflow of the metal resulted in a considerable width of the material being contacted successively by the corresponding juncture line on the punch, instead of one line on the punch contacting a single line or position on the blank, as will be explained more fully hereinafter in connection with Fig. 24. The distance N between the starting points of the elevations 22 thus came out to have a range rather than being a single value, because of the radius at 44. A punch 19 having the parameters listed hereinbefore was applied to a blank 16 shown in Figs. 22 and 23 with a force ranging from 3100 to 3200 tons, with the following resulting parameters for the blank:

|   | Inches |
|---|---|
| G | 7.5 |
| T | .811 |
| M | .530 |
| N | 4.4–4.65 |
| H | 7.25–7.35 |
| L | .615 |

From a theoretical standpoint, it may be readily calculated that if the blank had been coined to the point where M equal .516 inch, then the metal in the elevations 22 should exactly fill the voids 23. It has been found in practice, however, that when the coining is carried to this extreme, there is a somewhat excessive amount of metal placed in the elevations 22, insofar as satisfactory subsequent drawing is concerned. Furthermore, to carry the coining this far requires a tonnage much greater, and all out of proportion, to the 3200 tons used in the preferred practice of this invention; this places an undue strain on the punching tool and endangers it. It has been found in practice that carrying out the invention as described above produces quite satisfactorily the essential object of this invention, which is to produce a coined blank having substantially the same amount of metal in any given sector or pie shaped area.

Fig. 24 shows an enlarged fragmentary view of the relationship between the blank 16, the punch 19 and the die 18 at the conclusion of the coining operation. It will be noted that the surface of the elevation 22 has pulled away from the face of the punch 19, and more particularly from the face of the punch relief 20. Such pulling away is not downward, but instead is outward, as illustrated by the arrow 46, and is attributable to the outward flowing of the metal during the coining operation.

The parameters employed above were used in conjunction with cartridge case steel bearing the American Iron and Steel Institute designation C 1030, also known as F. S. 1030. This steel conforms to U. S. Army specification MIL–S–3289, except that the steel used had not been spheroidized; in other words, the steel had been merely hot-rolled. As explained hereinbefore, it has been found, in accordance with the present invention, that spheroidization is not necessary for steel blanks coined in accordance with the present invention. Annealing after coining has been found to be necessary before drawing, but this is true even when spheroidized metal is used. In the present instance, the chief difference is that instead of annealing at the customary 1200° F., following coining as with spheroidized metal, in the case of the unspheroidized metal used with the present invention, the coined blank was annealed at 1325° F. In each case, an annealing period of 1½ hours is employed. Thus, the spheroidization step is completely eliminated with resultant savings. The steel used, AISI 1030, had the following constituents in addition to the basic iron:

| Carbon | .25–.35%. |
|---|---|
| Manganese | .6–.9%. |
| Phosphorus | .04% max. |
| Sulfur | .45% max. |
| Silicon | .1% max. |

In order to better understand the flow pattern of the metal under the pressure of the punch 19, a square blank 16 as shown in Figs. 20 and 21 was scribed in the manner shown in Fig. 25. Half of the blank was scribed with orthogonal lines 48 and the other half was scribed with arcuate lines 49. In Fig. 25, the dotted line represents the die 18 within which the blank 16 was placed.

As shown in Fig. 26, the line pattern following coining demonstrates that the flow of metal into the void 23 in the die is not only radially outward from the sides, as shown by the arrow 51, but is also peripheral or circumferential from the corners of the square blank, as shown by the arrow 52. This is also demonstrated by the distortion of the rectangles near the corners of the square.

This is a continuation of application Serial No. 451,657 filed August 23, 1954, now abandoned.

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims.

What is claimed is:

1. A method of producing a metal blank, for making drawn cylinders, from a starting blank of generally flat substantially square shape comprising, the steps of: applying pressure to substantially the entire area of opposed faces of said starting blank sufficient to cause lateral and axial flow of the metal thereof while confining lateral flow at the corner portions of said starting blank to the space within a single cylindrical surface circumscribing said starting blank, controlling axial flow of metal in the region outwardly of the sides of said starting blank to produce axially relatively thick portions between said corner portions, thicker than said corner portions, and continuing the application of said pressure until the portions between said corner portions flow laterally closely approaching said cylindrical surface, and terminating application of said pressure before said portions between said corner portions reach said cylindrical surface whereby to form a blank wherein the volumes of all equi-angular sectors thereof are substantially equal.

2. The method of claim 1 wherein said step of controlling axial flow of metal in the region outwardly of said sides is performed so as to produce said axially relatively thick portions tapering from a mid-point between said corner portions, thicker than said corner portions and toward said corner portions and also toward the center of said blank.

3. A method of producing a metal blank, for making drawn cylinders, from a starting blank of generally flat substantially square shape comprising, the steps of: placing said starting blank in the bottom of a cylindrical die of a diameter approximately equal to a diagonal of said starting blank, pressing a punch on said starting blank to cause axial and lateral flow of the metal thereof, said punch and die being formed with opposed pressure surfaces engaging substantially the entire area of opposed faces of said starting blank and having greater axial spacing therebetween in the regions outwardly of the sides of said starting blank between its corners than in the regions of said corners, pressing said punch on said starting blank until the metal thereof at the corner portions of the blank conforms to the sides of said die, and terminating the pressure of said punch before the portions of said blank between said corner portions engage the sides of said die.

4. A coined blank for making drawn cylinders comprising, a disc of metal having circumferentially spaced edge portions defining a single cylindrical boundary surface, the edge regions of said blank between said circumferentially spaced portions being spaced inwardly from said cylindrical surface and being thicker than said spaced portions and so dimensioned that the volumes of all equi-angular sectors of said blank are substantially equal, said blank being formed by distorting a polygonal starting blank with the metal of the corner portions of said starting blank constituting said circumferentially spaced portions of said coined blank.

5. A coined blank as defined in claim 4 wherein said circumferentially spaced edge portions are of approximately uniform thickness.

6. A coined blank as defined in claim 4 wherein each of said thicker edge regions taper, in thickness, inwardly of said blank to inner generally arcuate boundaries.

7. A coined blank as defined in claim 6 wherein each of said thicker edge regions tapers, in thickness, from a mid-point toward the adjacent circumferentially spaced portions.

References Cited in the file of this patent

UNITED STATES PATENTS

| | | |
|---|---|---|
| 1,396,281 | Paque | Nov. 8, 1921 |
| 1,410,093 | Dallmeyer | Mar. 21, 1922 |
| 1,709,328 | Stover | Apr. 16, 1929 |
| 1,931,210 | Steinacher | Oct. 17, 1933 |
| 2,156,439 | Takeda | May 2, 1939 |
| 2,158,434 | Schwartz | May 16, 1939 |
| 2,343,253 | Clark | Mar. 7, 1944 |
| 2,360,354 | Lyon | Oct. 17, 1944 |
| 2,533,942 | Jongedyk | Dec. 12, 1950 |